(12) United States Patent
Maguire et al.

(10) Patent No.: US 12,525,637 B2
(45) Date of Patent: Jan. 13, 2026

(54) TRACTION BATTERY PACK ASSEMBLING METHOD

(71) Applicant: Ford Global Technologies, LLC, Dearborn, MI (US)

(72) Inventors: Patrick Daniel Maguire, Ann Arbor, MI (US); Che-Chun Chang, Ann Arbor, MI (US); Marc Dugas, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 683 days.

(21) Appl. No.: 17/943,495

(22) Filed: Sep. 13, 2022

(65) Prior Publication Data

US 2023/0307691 A1   Sep. 28, 2023

Related U.S. Application Data

(60) Provisional application No. 63/322,766, filed on Mar. 23, 2022.

(51) Int. Cl.
| | | |
|---|---|---|
| *H01M 10/04* | (2006.01) | |
| *B60L 50/60* | (2019.01) | |
| *B60L 50/64* | (2019.01) | |
| *H01M 50/204* | (2021.01) | |
| *H01M 50/289* | (2021.01) | |

(52) U.S. Cl.
CPC ......... *H01M 10/0481* (2013.01); *B60L 50/64* (2019.02); *B60L 50/66* (2019.02); *H01M 50/204* (2021.01); *H01M 50/289* (2021.01); *H01M 2220/20* (2013.01)

(58) Field of Classification Search
None
See application file for complete search history.

(56) References Cited

U.S. PATENT DOCUMENTS

| | | |
|---|---|---|
| 8,089,248 B2 | 1/2012 | Tabatowski-Bush |
| 8,968,912 B2 | 3/2015 | Maguire et al. |
| 9,217,781 B2 | 12/2015 | Tabatowski-Bush et al. |
| 9,425,628 B2 | 8/2016 | Pham et al. |
| 9,446,680 B2 | 9/2016 | Chen et al. |
| 9,515,357 B2 | 12/2016 | Haskins et al. |
| 9,799,932 B2 | 10/2017 | Haskins et al. |

(Continued)

FOREIGN PATENT DOCUMENTS

| | | |
|---|---|---|
| CN | 101860053 A | 10/2010 |
| CN | 101860053 B | 4/2015 |

(Continued)

OTHER PUBLICATIONS

Abstract of KR-20140087780-A (Year: 2014).*

*Primary Examiner* — Gregg Cantelmo
(74) *Attorney, Agent, or Firm* — David B. Kelley; Carlson, Gaskey & Olds, P.C.

(57) ABSTRACT

A traction battery pack assembling method includes compressing a first cell stack within a first compression fixture, compressing a second cell stack within a second compression fixture, positioning the first cell stack and the first compression fixture next to the second cell stack and the second compression fixture, and inserting the first and second cell stacks into a cell-receiving opening of an enclosure structure by pushing the first and second cell stacks together into the cell-receiving opening.

19 Claims, 6 Drawing Sheets

(56) References Cited

U.S. PATENT DOCUMENTS

| | | |
|---|---|---|
| 10,109,897 B2 | 10/2018 | Haskins et al. |
| 10,566,647 B2 | 2/2020 | Andryukov et al. |
| 10,601,006 B2 | 3/2020 | Maguire et al. |
| 10,608,222 B2 | 3/2020 | Montgomery et al. |
| 10,759,281 B2 | 9/2020 | Miller et al. |
| 10,784,495 B2 | 9/2020 | Fernandez-Galindo et al. |
| 11,005,131 B2 | 5/2021 | Zhou et al. |
| 11,024,913 B2 | 6/2021 | Subramanian et al. |
| 11,050,125 B1 | 6/2021 | Zhu et al. |
| 11,114,726 B2 | 9/2021 | Gu et al. |
| 11,128,009 B2 | 9/2021 | Chen et al. |
| 11,139,537 B2 | 10/2021 | Wu et al. |
| 11,217,847 B2 | 1/2022 | Eftekhari et al. |
| 11,258,119 B2 | 2/2022 | Wang et al. |
| 11,264,669 B2 | 3/2022 | Jiang |
| 11,283,130 B2 | 3/2022 | Chen et al. |
| 11,289,750 B2 | 3/2022 | Zhou et al. |
| 11,302,972 B2 | 4/2022 | Chu et al. |
| 11,302,973 B2 | 4/2022 | Maguire et al. |
| 11,302,990 B2 | 4/2022 | Huang et al. |
| 11,329,347 B2 | 5/2022 | Huang et al. |
| 11,335,960 B2 | 5/2022 | Wang et al. |
| 11,362,392 B2 | 6/2022 | Wang et al. |
| 11,362,393 B2 | 6/2022 | Wang et al. |
| 11,387,519 B2 | 7/2022 | Huang et al. |
| 11,404,744 B1 | 8/2022 | Yang et al. |
| 11,417,932 B2 | 8/2022 | Tang et al. |
| 11,417,936 B2 | 8/2022 | Wang et al. |
| 2010/0259221 A1 | 10/2010 | Tabatowski-Bush |
| 2010/0304203 A1* | 12/2010 | Buck ............ H01M 10/647 29/730 |
| 2013/0164592 A1 | 6/2013 | Maguire et al. |
| 2017/0104251 A1 | 4/2017 | Wang |
| 2019/0305389 A1 | 10/2019 | Poirier et al. |
| 2019/0312243 A1* | 10/2019 | Maguire ........... H01M 10/0481 |
| 2020/0091494 A1 | 3/2020 | Fernandez-Galindo et al. |
| 2020/0203684 A1 | 6/2020 | Chen et al. |
| 2020/0203779 A1 | 6/2020 | Wang et al. |
| 2020/0212387 A1 | 7/2020 | Su et al. |
| 2020/0212397 A1 | 7/2020 | Wang et al. |
| 2020/0212418 A1 | 7/2020 | Chen et al. |
| 2020/0381697 A1 | 12/2020 | Fernandez-Galindo et al. |
| 2021/0066686 A1 | 3/2021 | Siewert et al. |
| 2021/0091348 A1 | 3/2021 | Lateef et al. |
| 2021/0091437 A1 | 3/2021 | Chen et al. |
| 2021/0104798 A1 | 4/2021 | Jiang et al. |
| 2021/0119279 A1 | 4/2021 | Wang et al. |
| 2021/0218117 A1 | 7/2021 | Zhu et al. |
| 2021/0229541 A1 | 7/2021 | Smith et al. |
| 2021/0305641 A1 | 9/2021 | Bai et al. |
| 2021/0305642 A1 | 9/2021 | Bai et al. |
| 2021/0320349 A1 | 10/2021 | Jiang et al. |
| 2021/0320372 A1 | 10/2021 | Jiang et al. |
| 2021/0402863 A1 | 12/2021 | Huang et al. |
| 2021/0408634 A1 | 12/2021 | Yin et al. |
| 2022/0052414 A1 | 2/2022 | Huang et al. |
| 2022/0052415 A1 | 2/2022 | Huang et al. |
| 2022/0059897 A1 | 2/2022 | Huang et al. |
| 2022/0059902 A1 | 2/2022 | Jiang et al. |
| 2022/0077521 A1 | 3/2022 | Jin et al. |
| 2022/0085450 A1 | 3/2022 | Chu et al. |
| 2022/0102800 A1 | 3/2022 | Wang et al. |
| 2022/0109211 A1 | 4/2022 | Wang et al. |
| 2022/0123394 A1 | 4/2022 | Zhang et al. |
| 2022/0123423 A1 | 4/2022 | Wang et al. |
| 2022/0149458 A1 | 5/2022 | Jiang et al. |
| 2022/0158296 A1 | 5/2022 | Chen et al. |
| 2022/0185088 A1 | 6/2022 | Zhang et al. |
| 2022/0190416 A1 | 6/2022 | Wu |
| 2022/0190423 A1 | 6/2022 | Wu et al. |
| 2022/0216555 A1 | 7/2022 | Huang et al. |
| 2022/0221084 A1 | 7/2022 | Huang et al. |
| 2022/0231370 A1 | 7/2022 | Yang et al. |
| 2022/0231371 A1 | 7/2022 | Jiang et al. |
| 2022/0255172 A1 | 8/2022 | Guo et al. |

FOREIGN PATENT DOCUMENTS

| | | |
|---|---|---|
| CN | 107757374 A | 3/2018 |
| CN | 208738329 U | 4/2019 |
| CN | 209016158 U | 6/2019 |
| CN | 209045657 U | 6/2019 |
| CN | 110048042 A | 7/2019 |
| CN | 209071465 U | 7/2019 |
| CN | 209104196 U | 7/2019 |
| CN | 209104221 U | 7/2019 |
| CN | 209104222 U | 7/2019 |
| CN | 209104228 U | 7/2019 |
| CN | 209104230 U | 7/2019 |
| CN | 209104232 U | 7/2019 |
| CN | 209104234 U | 7/2019 |
| CN | 209104235 U | 7/2019 |
| CN | 209104236 U | 7/2019 |
| CN | 209104237 U | 7/2019 |
| CN | 209104238 U | 7/2019 |
| CN | 209104242 U | 7/2019 |
| CN | 209104331 U | 7/2019 |
| CN | 209183581 U | 7/2019 |
| CN | 209183604 U | 7/2019 |
| CN | 209183605 U | 7/2019 |
| CN | 209183611 U | 7/2019 |
| CN | 209183612 U | 7/2019 |
| CN | 209183614 U | 7/2019 |
| CN | 209249637 U | 8/2019 |
| CN | 209357799 U | 9/2019 |
| CN | 209401679 U | 9/2019 |
| CN | 209401680 U | 9/2019 |
| CN | 209401682 U | 9/2019 |
| CN | 209401684 U | 9/2019 |
| CN | 209401715 U | 9/2019 |
| CN | 209447908 U | 9/2019 |
| CN | 110350256 A | 10/2019 |
| CN | 110416448 A | 11/2019 |
| CN | 209592271 U | 11/2019 |
| CN | 209607884 U | 11/2019 |
| CN | 209641720 U | 11/2019 |
| CN | 209710493 U | 11/2019 |
| CN | 209730104 U | 12/2019 |
| CN | 209747621 U | 12/2019 |
| CN | 209787546 U | 12/2019 |
| CN | 209843820 U | 12/2019 |
| CN | 209936788 U | 1/2020 |
| CN | 110931700 A | 3/2020 |
| CN | 210136922 U | 3/2020 |
| CN | 210136943 U | 3/2020 |
| CN | 210182435 U | 3/2020 |
| CN | 210566905 U | 5/2020 |
| CN | 111354885 A | 6/2020 |
| CN | 210744037 U | 6/2020 |
| CN | 111384314 B | 1/2021 |
| CN | 111384325 B | 2/2021 |
| CN | 112310525 A | 2/2021 |
| CN | 112331982 A | 2/2021 |
| CN | 109742281 B | 5/2021 |
| CN | 111354987 B | 5/2021 |
| CN | 111384337 B | 5/2021 |
| CN | 112331981 B | 9/2021 |
| CN | 112331997 B | 11/2021 |
| CN | 113871789 A | 12/2021 |
| CN | 112310541 B | 3/2022 |
| CN | 216054919 U | 3/2022 |
| CN | 216120549 U | 3/2022 |
| CN | 216120659 U | 3/2022 |
| CN | 216213898 U | 4/2022 |
| CN | 216354437 U | 4/2022 |
| CN | 216354439 U | 4/2022 |
| CN | 111430826 B | 6/2022 |
| CN | 216720168 U | 6/2022 |
| CN | 216720172 U | 6/2022 |
| CN | 216750072 U | 6/2022 |
| CN | 216750142 U | 6/2022 |
| CN | 216872085 U | 7/2022 |
| CN | 216903107 U | 7/2022 |
| CN | 216903128 U | 7/2022 |
| CN | 216903497 U | 7/2022 |

(56) References Cited

FOREIGN PATENT DOCUMENTS

| | | |
|---|---|---|
| DE | 102016119118 A1 | 4/2017 |
| DE | 102017121796 A1 | 3/2018 |
| DE | 102019108631 A1 | 10/2019 |
| DE | 102019125140 A1 | 3/2020 |
| DE | 102020124986 A1 | 3/2021 |
| DE | 102021101385 A1 | 9/2021 |
| EP | 3671904 A1 | 6/2020 |
| EP | 3671940 A1 | 6/2020 |
| EP | 3672377 A1 | 6/2020 |
| EP | 3675204 A1 | 7/2020 |
| EP | 3675207 A1 | 7/2020 |
| EP | 3675216 B1 | 7/2020 |
| EP | 3675217 A1 | 7/2020 |
| EP | 3675220 A1 | 7/2020 |
| EP | 3675221 A1 | 7/2020 |
| EP | 3675236 A1 | 7/2020 |
| EP | 3675271 A1 | 7/2020 |
| EP | 3798491 A1 | 3/2021 |
| EP | 3799150 A1 | 3/2021 |
| EP | 3799151 A1 | 3/2021 |
| EP | 3905366 A1 | 3/2021 |
| EP | 3806231 A1 | 4/2021 |
| EP | 3852187 A1 | 7/2021 |
| EP | 3920255 A1 | 8/2021 |
| EP | 3883005 A1 | 9/2021 |
| EP | 3883006 A1 | 9/2021 |
| EP | 3883042 A1 | 9/2021 |
| EP | 3886198 A1 | 9/2021 |
| EP | 3886200 A1 | 9/2021 |
| EP | 3886201 A1 | 9/2021 |
| EP | 3671893 B1 | 11/2021 |
| EP | 3699979 B1 | 11/2021 |
| EP | 3920315 A1 | 12/2021 |
| EP | 3930027 A1 | 12/2021 |
| EP | 3944397 A1 | 1/2022 |
| EP | 3944398 A1 | 1/2022 |
| EP | 3955332 A1 | 2/2022 |
| EP | 3955333 A1 | 2/2022 |
| EP | 3799194 B1 | 3/2022 |
| EP | 3985787 A1 | 4/2022 |
| EP | 3799153 B1 | 6/2022 |
| IN | 209104229 U | 7/2019 |
| JP | 2010246372 A | 10/2010 |
| KR | 1020100112530 A | 10/2010 |
| KR | 2014087780 A * | 7/2014 |
| KR | 101695641 B1 | 1/2017 |
| KR | 101890701 B1 | 8/2018 |
| WO | WO-2021177683 A1 * | 9/2021 ......... H01M 50/244 |

\* cited by examiner

TRACTION BATTERY PACK ASSEMBLING METHOD

CROSS-REFERENCE TO RELATED APPLICATIONS

This application claims priority to U.S. Provisional Application No. 63/322,766, which was filed on 23 Mar. 2022 and is incorporated herein by reference

TECHNICAL FIELD

This disclosure relates generally to a method of assembling a traction battery pack and, more particularly, to how battery cells are inserted into an enclosure of the battery pack.

BACKGROUND

Electrified vehicles differ from conventional motor vehicles because electrified vehicles include a drivetrain having one or more electric machines. The electric machines can drive the electrified vehicles instead of, or in addition to, an internal combustion engine. A traction battery pack assembly can power the electric machines. The traction battery pack assembly of an electrified vehicle can include groups of battery cells.

SUMMARY

In some aspects, the techniques described herein relate to a traction battery pack assembling method, including: compressing a first cell stack within a first compression fixture; compressing a second cell stack within a second compression fixture; positioning the first cell stack and the first compression fixture next to the second cell stack and the second compression fixture; and inserting the first and second cell stacks into a cell-receiving opening of an enclosure structure by pushing the first and second cell stacks together into the cell-receiving opening.

In some aspects, the techniques described herein relate to a method, wherein, during the pushing, the first cell stack is moved out of the first compression fixture into the enclosure structure, and the second cell stack is moved out of the second compression fixture into the enclosure structure.

In some aspects, the techniques described herein relate to a method, wherein the first cell stack and the second cell stack are spaced from each other during the pushing.

In some aspects, the techniques described herein relate to a method, further including contacting the first cell stack and the second cell stack with a plunger during the pushing.

In some aspects, the techniques described herein relate to a method, wherein the first compression fixture and the second compression fixture establish different perimeter portions of an aperture when the first compression fixture is positioned alongside the second compression fixture, and further including extending the plunger through the aperture during the pushing.

In some aspects, the techniques described herein relate to a method, further including, positioning a spacer between the first cell stack and the second cell stack, the spacer located between the first cell stack and the second cell stack during the pushing.

In some aspects, the techniques described herein relate to a method, wherein the first cell stack includes a plurality of first cells each directly contacting a first side of the spacer, wherein the second cell stack includes a plurality of second cells each directly contacting an opposite, second side of the spacer.

In some aspects, the techniques described herein relate to a method, wherein the spacer is inserted into the cell-receiving opening together with the first cell stack and the second cell stack.

In some aspects, the techniques described herein relate to a method, wherein a compressive force exerted on the first cell stack by the enclosure structure after the inserting is less than a compressive force exerted on the first cell stack by the first compression fixture prior to the inserting.

In some aspects, the techniques described herein relate to a method, wherein the compressing of the first cell stack is along a first cell stack axis, and the compressing of the second cell stack is along a second cell stack axis, wherein the first cell stack axis is parallel to the second cell stack axis during the inserting.

In some aspects, the techniques described herein relate to a method, wherein the pushing moves the first cell stack and the second cell stack relative to the enclosure structure into the enclosure structure a direction that is perpendicular to both the first cell stack axis and the second cell stack axis.

In some aspects, the techniques described herein relate to a method, wherein the compressing of the first cell stack is along a first cell stack axis, and the compressing of the second cell stack is along a second cell stack axis, wherein the first cell stack axis is parallel to the second cell stack axis during the pushing.

In some aspects, the techniques described herein relate to a method, further including, after the inserting, applying a compressive force to the first cell stack and the second cell stack with the enclosure structure.

In some aspects, the techniques described herein relate to a method, wherein the enclosure structure circumferentially surrounds the first cell stack and the second cell stack after the inserting.

In some aspects, the techniques described herein relate to a method, wherein the enclosure structure is an enclosure halo.

In some aspects, the techniques described herein relate to a traction battery pack assembling method, including: arranging a plurality of battery cells into a first group distributed along a first axis, and a second group distributed along a second axis; compressing the first group of cells to provide a first cell stack, and compressing the second group of cells to provide a second cell stack; positioning the first cell stack alongside the second cell stack; and pressing a plunger against the first cell stack and against the second cell stack to move the first cell stack and the second cell stack into a cell-receiving opening of an enclosure structure.

In some aspects, the techniques described herein relate to a method, wherein, during the pressing, the first cell stack is moved out of a first compression fixture into the enclosure structure, and the second cell stack is moved out of a second compression fixture into the enclosure structure.

In some aspects, the techniques described herein relate to a method, wherein the first compression fixture and the second compression fixture establish different perimeter portions of an aperture when the first cell stack is positioned alongside the second cell stack, the plunger extending through the aperture during the pressing.

In some aspects, the techniques described herein relate to a method, wherein the enclosure structure is an enclosure halo.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details example traction battery pack assemblies having an enclosure that provides an interior area. Battery cells and electronic modules can be held within the interior area along with other components. The battery cells can be used to power an electric machine.

In particular, this disclosure details an exemplary methods of assembling traction battery pack assemblies.

Figure 1:
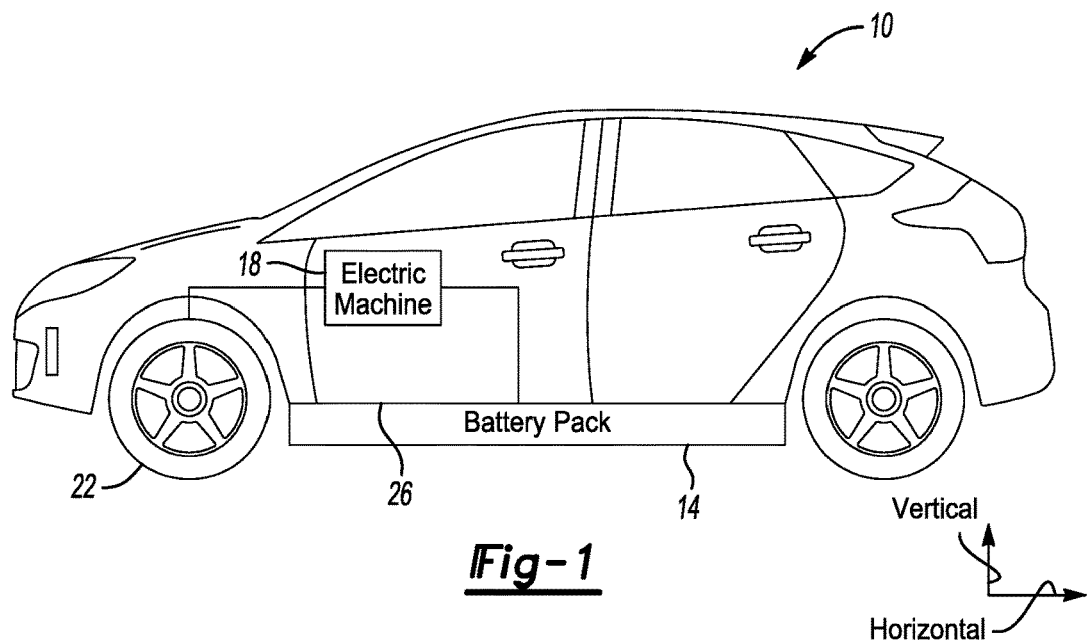
FIG. 1 illustrates a side view of an electrified vehicle.

With reference to FIG. 1, an electrified vehicle 10 includes a traction battery pack 14, an electric machine 18, and wheels 22. The traction battery pack 14 powers an electric machine 18, which can convert electrical power to torque to drive the wheels 22. The traction battery pack 14 can be a relatively high-voltage battery.

The traction battery pack 14 is, in the exemplary embodiment, secured to an underbody 26 of the electrified vehicle 10. The traction battery pack 14 could be located elsewhere on the electrified vehicle 10 in other examples.

The electrified vehicle 10 is an all-electric vehicle. In other examples, the electrified vehicle 10 is a hybrid electric vehicle, which selectively drives wheels using torque provided by an internal combustion engine instead of, or in addition to, an electric machine. Generally, the electrified vehicle 10 could be any type of vehicle having a traction battery pack.

Figure 2:
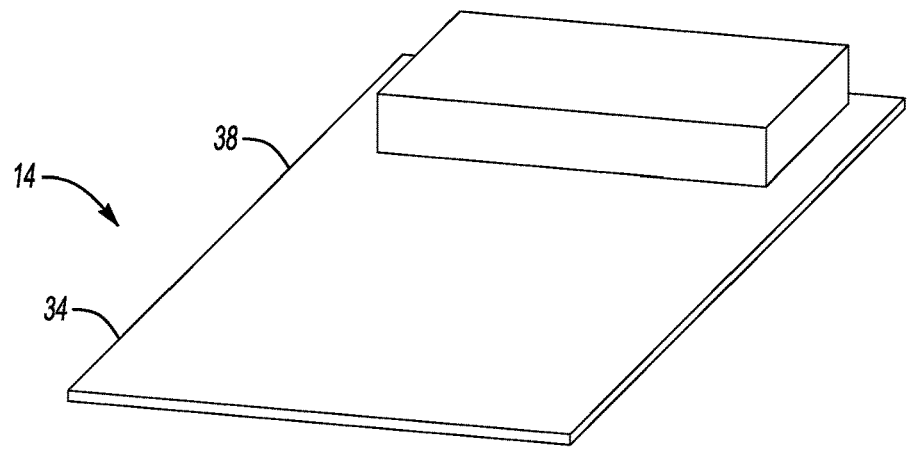
FIG. 2 illustrates a partially expanded view of a traction battery pack assembly from the electrified vehicle of FIG. 1 according to an exemplary aspect of the present disclosure.
Figure 2:
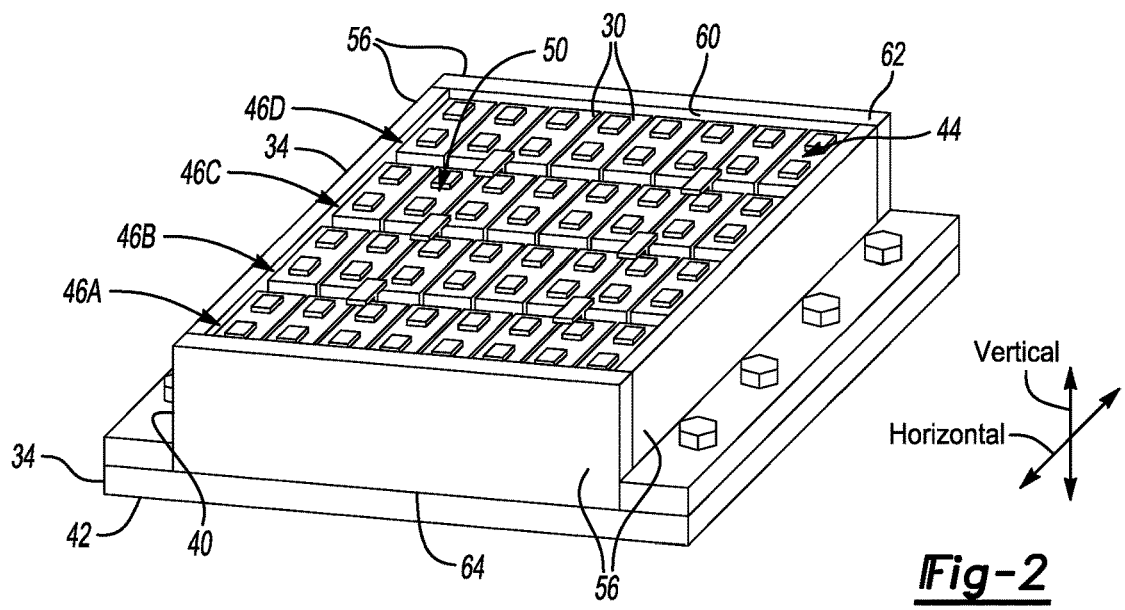

With reference now to FIG. 2, the traction battery pack 14 includes a plurality of battery cells 30 held within an enclosure assembly 34. In the exemplary embodiment, the enclosure assembly 34 comprises various enclosure structures. In particular, the example enclosure assembly 34 includes an enclosure cover 38, an enclosure halo 40, and an enclosure floor 42. The enclosure cover 38, enclosure halo 40, and enclosure floor 42 are secured together to provide an interior area 44 that houses the plurality of battery cells 30.

The plurality of battery cells (or simply, "cells") 30 are for supplying electrical power to various components of the electrified vehicle 10. The battery cells 30 are grouped and stacked along an axis to construct one of a plurality of cell stacks 46, which are then positioned side-by-side to provide a cell matrix 50. In this example, each cell stack 46 includes eight individual battery cells 30, and the cell matrix 50 includes four cell stacks 46.

Although a specific number of battery cells 30 and cell stacks 46 are illustrated in the various embodiments of this disclosure, the traction battery pack 14 could include any number of cells 30 and cell stacks 46. In other words, this disclosure is not limited to the specific configuration of cells 30 shown in FIG. 2. The cell matrix 50 could instead include less than four cell stacks or more than four stacks, for example.

The enclosure halo 40, in this example, includes a plurality of side walls 56 arranged relative to one another to provide a cell-receiving opening 60. The side walls 56 can be extruded structures connected together by welding, for example.

When the traction battery pack 14 is assembled, the enclosure cover 38 can be secured to a vertically upper side 62 of the enclosure halo 40. An interface between the enclosure cover 38 and the enclosure halo 40 extends circumferentially continuously about the interior area 44. When the traction battery pack 14 is assembled, the enclosure floor 42 can be secured to vertically lower side 64 of the enclosure halo 40. An interface between the enclosure floor 42 and the enclosure halo 40 extends circumferentially continuously about the interior area 44. Mechanical fasteners or welds, for example, can be used to secure the enclosure cover 38 and the enclosure floor 42 to the enclosure halo 40. Vertical and horizontal, for purposes of this disclosure, is with reference to ground and a general orientation of the electrified vehicle 10 during operation.

When the traction battery pack 14 is assembled, the cell matrix 50 is positioned within the cell-receiving opening 60. The example enclosure halo 40 includes one cell-receiving opening 60, but it should be understood that this disclosure also extends to enclosure assemblies providing more than one cell-receiving opening. The enclosure cover 38 can cover the cell matrix 50 within the cell-receiving opening 60 to substantially surround the cell matrix 50 from all sides.

The enclosure halo 40 compresses and holds the cell matrix 50 when the cell matrix 50 is inserted into the cell-receiving opening 60 of the enclosure halo 40. In this example, the side walls 56 of the enclosure halo 40 apply forces to the cell matrix 50 when the cell matrix 50 is positioned within the cell-receiving opening 60.

The traction battery pack 14 can be considered a cell-to-pack battery assembly. Unlike conventional traction battery pack battery assemblies, a cell-to-pack battery assembly incorporates battery cells or other energy storage devices into the enclosure assembly 34 without the cells being arranged in arrays or modules. The enclosure assembly 34 applies compressive forces to the cells. The cell-to-pack battery assembly may therefore eliminate most, if not all, of the array support structures used in conventional battery arrays (e.g., array frames, spacers, rails, walls, endplates, bindings, etc.) that are used to group and hold the battery cells within the arrays/modules.

The cell matrix 50 of the exemplary traction battery pack 14 comprises a plurality of separate cell stacks 46, which may be simultaneously inserted into the cell-receiving opening of the enclosure halo 40. They may alternatively be inserted in smaller subgroups of cell stacks or as single cell stacks. To insert the example cell matrix 50 into the cell-receiving opening 60, the cells stacks 46 of the cell matrix 50 are compressed and, while compressed, moved into place in the cell-receiving opening 60. The fixturing relied on to compress the cell stacks 46 is removed as the cell matrix 50 is inserted. The cell stacks 46 can expand somewhat within the enclosure assembly 34, but are still compressed by the enclosure assembly 34.

Figure 3:
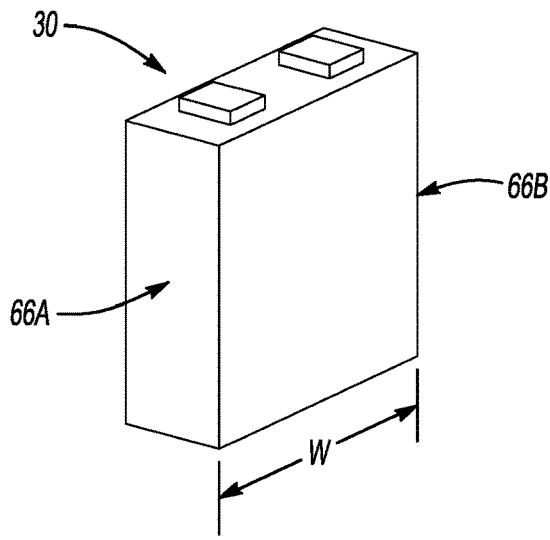
FIG. 3 illustrates a battery cell from the traction battery pack assembly of FIG. 2.

With reference now to FIG. 3 and continued reference to FIGS. 1 and 2, the battery cells 30 of the exemplary embodiment are prismatic, lithium-ion cells. However, battery cells having other geometries (cylindrical, pouch, etc.) and/or chemistries (nickel-metal hydride, lead-acid, etc.) could alternatively be utilized within the scope of this disclosure.

The example battery cells 30 each include a first laterally facing side 66A and an opposite, second laterally facing side 66B. When the battery cells 30 are assembled into cell stacks 46 within the traction battery pack 14, the first and second laterally facing sides 66A, 66B face horizontally outward away from the axis of the respective cell stack 46.

As can be appreciated, manufacturing tolerances and other factors can lead to slight variations in the size of some battery cells 30. A width W, here a horizontal width, of each cell 30 can vary slightly, for example. The example assembling methods of this disclosure can help to accommodate these variations.

Figure 4:
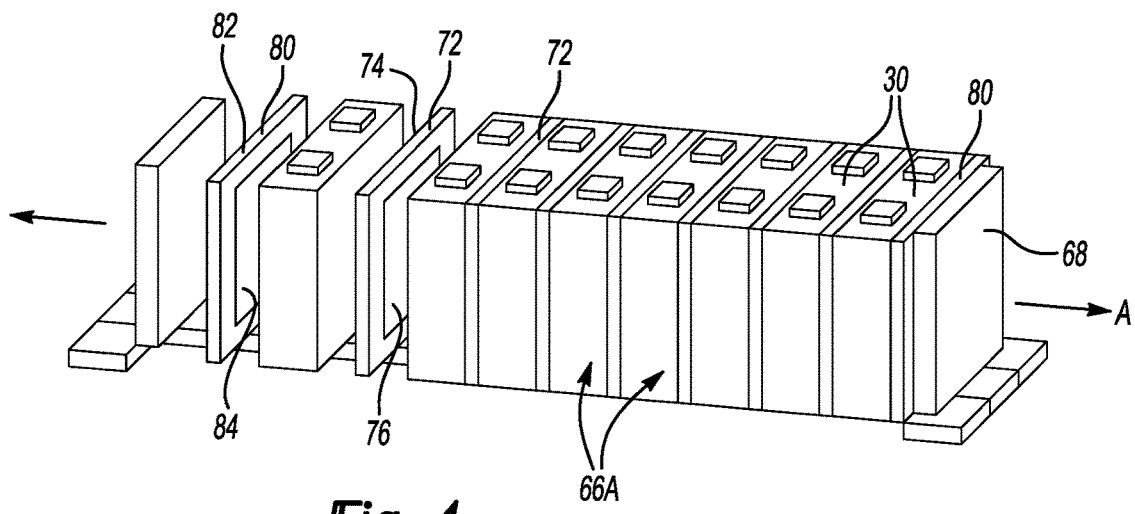
FIG. 4 illustrates a group of cells being compressed by a compression fixture to provide a cell stack for the traction battery pack assembly of FIG. 2.
Figure 5:
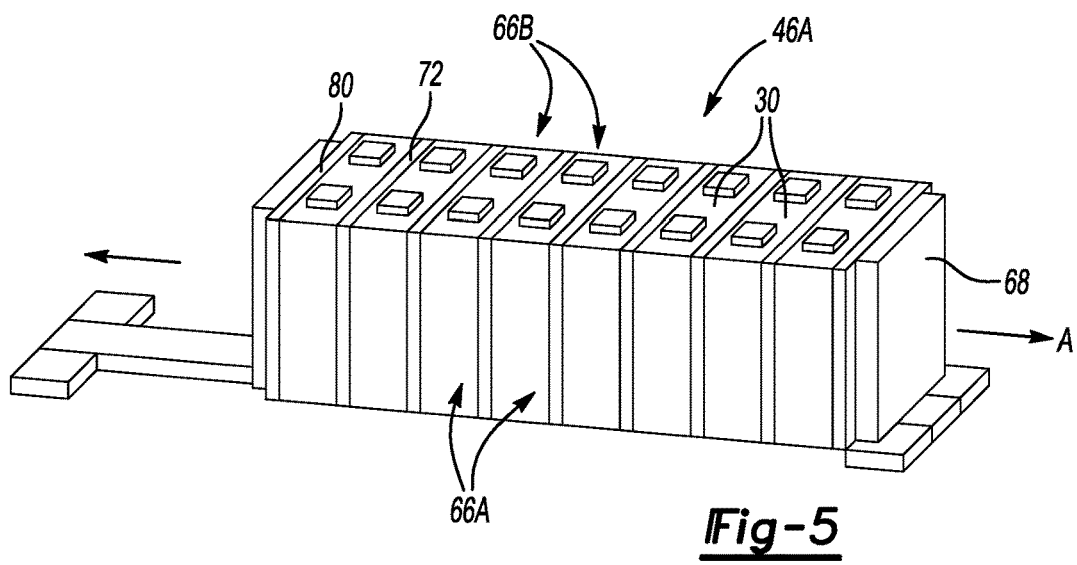
FIG. 5 illustrates the group of cells of FIG. 4 compressed by the compression fixture and providing the cell stack.

An exemplary method of assembling the traction battery pack 14 includes distributing a first group of cells 30 along a cell stack axis A, and then compressing the first group of cells 30 along the cell stack axis A as shown in FIGS. 4 and 5 to provide one of the cell stacks 46A.

In this example, a compression fixture 68 is used to compress the cells 30 along the cell stack axis A. The compressive force exerted on the cells 30 by the compression fixture 68 is 3 kilonewtons in some examples. The compression fixture 68 could be driven by a pneumatic actuator, for example, to compress the cells 30 along the cell stack axis A.

In this example, within the cells stack 46A, separator plates 72 are disposed between each of the cells 30 along the cell stack axis A. The separator plates 72 can include a frame portion 74 that holds a compressible material 76. The compressible material 76 can compress to permit some expansion of the cells 30. The compressible material 76 can be foam.

Slider plates 80 are disposed at opposing axial ends of the cells 30 of the cell stack 46A. The slider plates 80 include a frame portion 82 that holds a compressible material 84. The compressible material 76 can be foam. The compressible material 84 can compress to permit some expansion of the cells 30.

Figure 6:
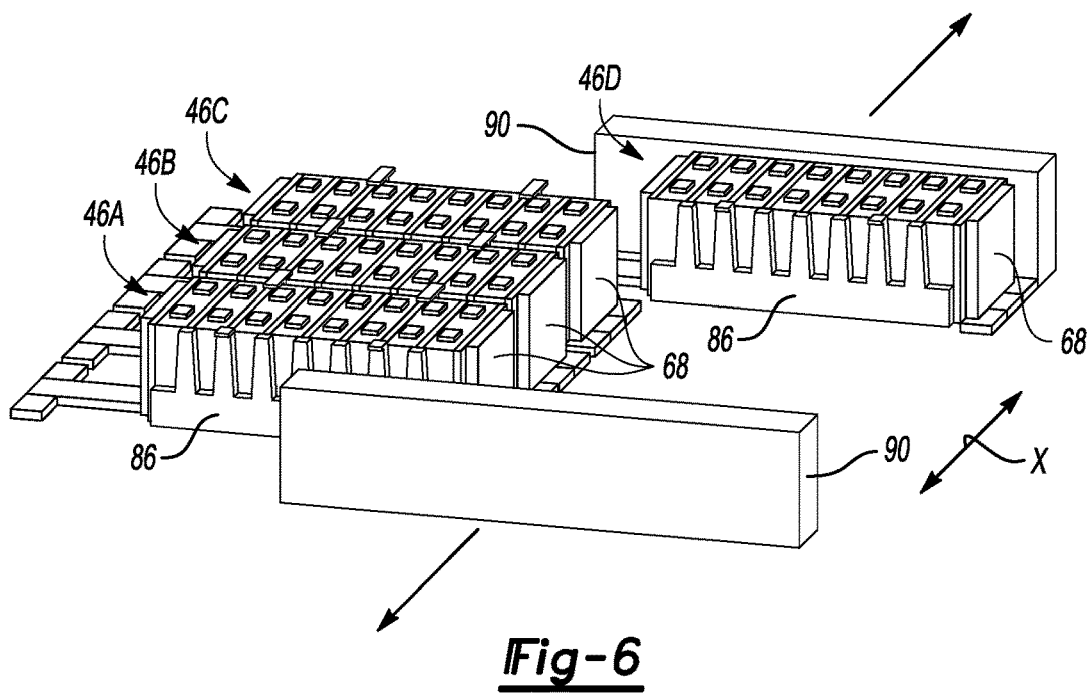
FIG. 6 illustrates a perspective view of the cell stack of FIG. 6 being aligned with other cell stacks to provide a cell matrix for the traction battery pack assembly of FIG. 2.
Figure 7:
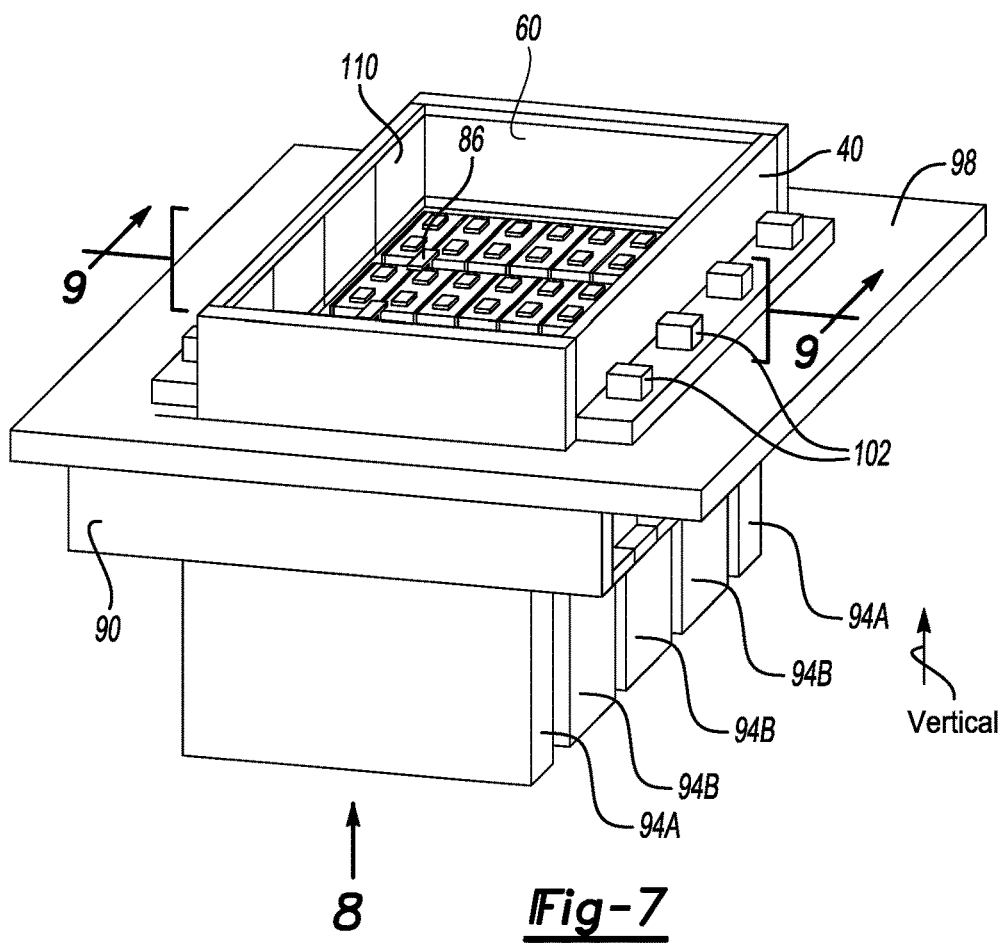
FIG. 7 illustrates the cell matrix of FIG. 6 being inserted into an enclosure halo.

The grouping and compressing is repeated to provide each of the remaining cell stacks 46B to 46D that will combine to form the cell matrix 50 of the traction battery pack 14. Next, as shown in FIGS. 6 and 7, the cell matrix 50 is established by positioning the cell stacks 46A to 46D side-by-side while compression fixtures 68 are holding the cell stacks 46. Each of the cell stacks 46A to 46D is held by a different one of the compression fixtures 68. A cell matrix joiner assembly 90, in this example, can be moved by an actuator along a joiner axis X to press the cell stacks 46A to 46D together along the axis X. When the traction battery pack 14 is installed within the vehicle, the axis X corresponds to a longitudinal axis of the electrified vehicle 10.

Within the cell matrix 50, spacers 86 are positioned sandwiched between the each of the cell stacks 46. The spacers 86 can keep the cell stacks 46 from directly contacting one another. Other spacers 86 are disposed at the ends of the cell matrix 50 adjacent the cell stacks 46A and 46D, respectively. After installing the cell matrix 50, the spacers 86 can provide a space to introduce an adhesive, if desired In an example, the cell matrix joiner assembly 90 presses the cell stacks 46 along the axis X until the compression fixtures 68 contact each other. Contact between the compression fixtures 68 can help to locate the cell stacks 46 relative to each other along the axis X.

In other examples, the spacers 86 are omitted, and the cell stacks 46 are pressed together by the cell matrix joiner assembly 90 until the cells 30 of one of the cell stacks 46 directly contact the cells 30 in another of the cell stacks 46.

Figure 8:
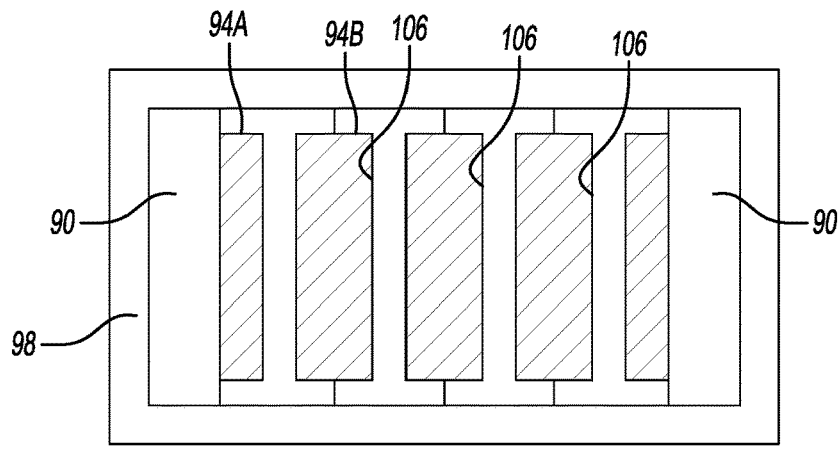
FIG. 8 illustrates a bottom view of FIG. 9.

After the pressing, the cell matrix 50 is moved relative to the enclosure halo 40 until the cell matrix 50 is vertically beneath the enclosure halo 40 and the cell-receiving opening 60 as shown in FIGS. 7 and 8. The cell matrix joiner assembly 90 and the compression fixtures 68 hold together the cell matrix 50 until the cell matrix 50 is positioned vertically beneath the enclosure halo 40.

The assembling method then inserts the cell matrix 50 into the cell-receiving opening 60 of the enclosure halo 40. During the inserting, the enclosure halo 40 is secured to a halo pallet 98. Locator pins 102 can be used to locate the enclosure halo 40 relative to the halo pallet 98 during the inserting.

To insert the cell matrix 50, a plurality of plungers 94 are driven upwards by actuators to push the cell stacks 46A to 46D vertically upward out of the compression fixtures 68 and into the cell-receiving opening 60. In other examples, the cell stacks 46A to 46D can be inserted into the cell-receiving opening 60 in other directions. The plungers 94 insert one cell matrix 50 in this example. In another example, more than one cell matrix 50 is inserted by the plungers 94 into the cell-receiving opening 60.

Spacings between the cell stacks 46A to 46D along the axis X is maintained during the inserting. That is, the positioning of the cell stacks 46A to 46D along the axis X is maintained during the inserting.

Each of the cell stacks 46A to 46D is compressed along the cell stack axis A by the respective compression fixture 68. Within the cell matrix 50, the cell stack axes A are parallel to each other. The inserting step moves the cell matrix 50 relative to the enclosure halo 40 in a direction that is perpendicular to the cell stack axes A.

The compression fixtures 68, when viewed from the bottom as shown in FIG. 8, may have an "I" shaped profile. The compression fixtures 68 each establish a different perimeter portion of a perimeter of an aperture 106 when in contact with each other. Together, the two compression fixtures establish an entire circumferential perimeter of the aperture 106.

In this example, the plurality of plungers 94 includes plungers 94A and plungers 94B. Each of the plungers 94B extends through one of the apertures 106 when pushing the cell matrix 50 into the cell-receiving opening 60. Each of the plungers 94B contacts two cell stacks 46 during the pushing. The plungers 94A contact a single cell stack during the pushing.

After the inserting, the enclosure halo 40 circumferentially surrounds the cell stack 46 of the cell matrix 50. The inserting positions the cell matrix 50 within the enclosure halo 40, which exerts a compressive force on the cell stacks 46. The enclosure halo 40 may permit some expansion of the cells 30 after being removed from the compression fixtures 68. A compressive force exerted on the cell stack 46 by the enclosure halo 40 after the inserting is thus less than a compressive force exerted on the cell stacks by the compression fixtures 68.

Figure 9:
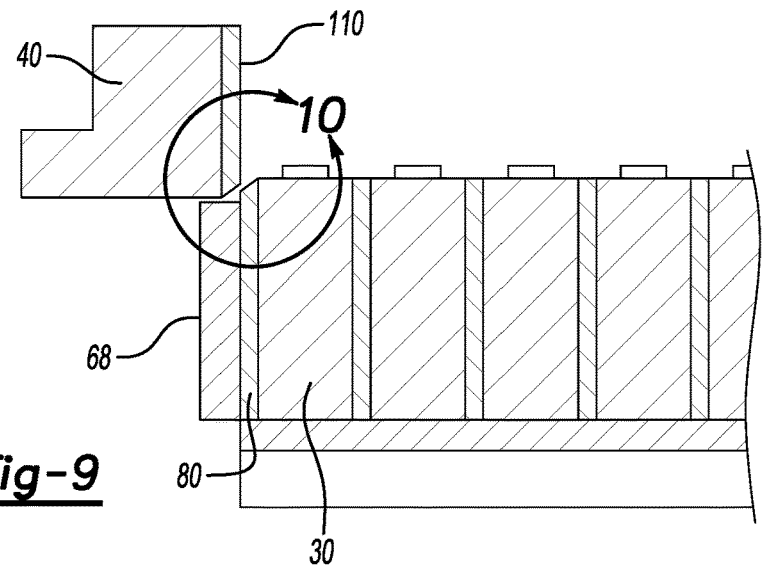
FIG. 9 illustrates section view generally taken at line 9-9 in FIG. 7.
Figure 10:
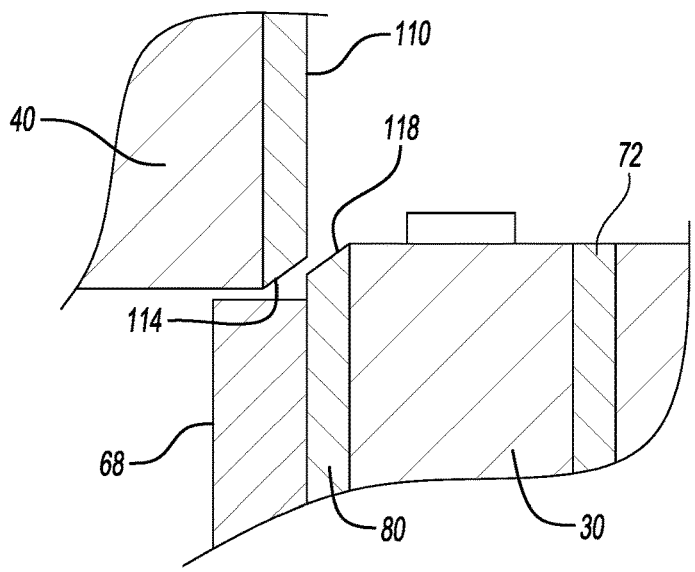
FIG. 10 illustrates a close-up view of an area of FIG. 9.

With reference to FIGS. 9 and 10, to facilitate the inserting, the inner surfaces of the example enclosure halo 40 are lined with shim plates 110 having leading edges 114 that are chamfered. The slider plates 80 associated with the cell stacks 46 have a leading edge 118 that is chamfered. The slider plates 80 interface directly with the shim plates 110 during the inserting. Chamfers on the leading edges 114 and the leading edges 118 can help to guide the cell stacks 46 into the cell-receiving opening 60 during the inserting.

Figure 11:
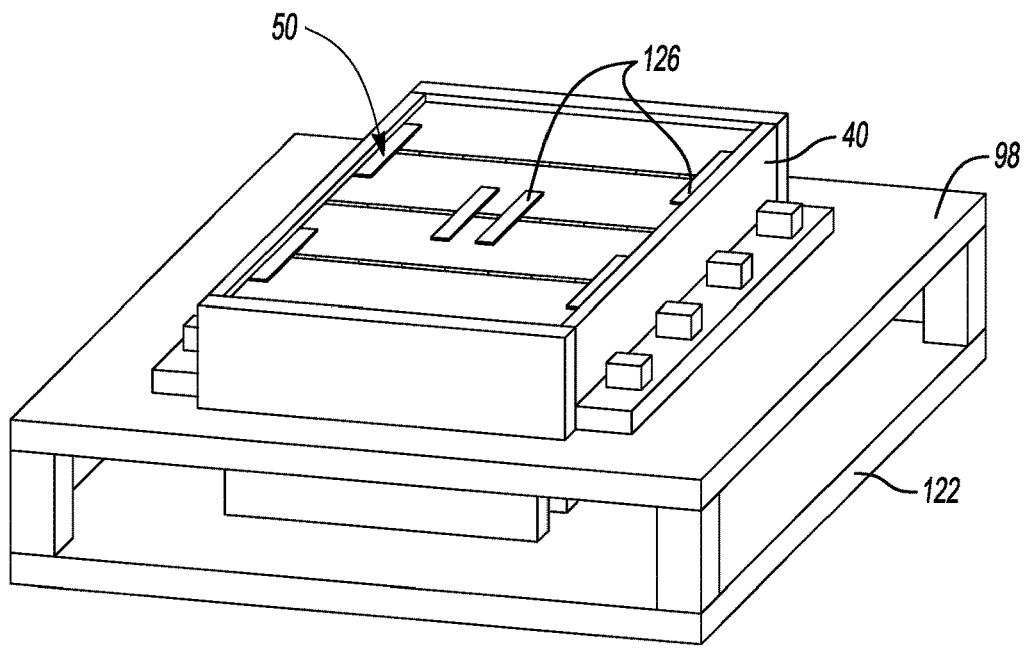
FIG. 11 illustrates the cell matrix and enclosure halo of FIG. 7 prior to securing an enclosure cover.

With reference to FIG. 11, after the cell matrix 50 is positioned within the halo pallet 98, the halo pallet 98 can be positioned on a weld pallet 122. Busbar modules 126 can then be installed and secured to the terminals of the battery cells 30. In an example, a busbar is connected to each cell stack 46 via laser welds. The welds are then inspected. If the inspection is passed, additionally busbars are installed that electrically connect the cell stacks 46 to each other. At this stage, adhesives could also be injected between the cell stacks 46 to help bind together the cell matrix 50.

Figure 12:
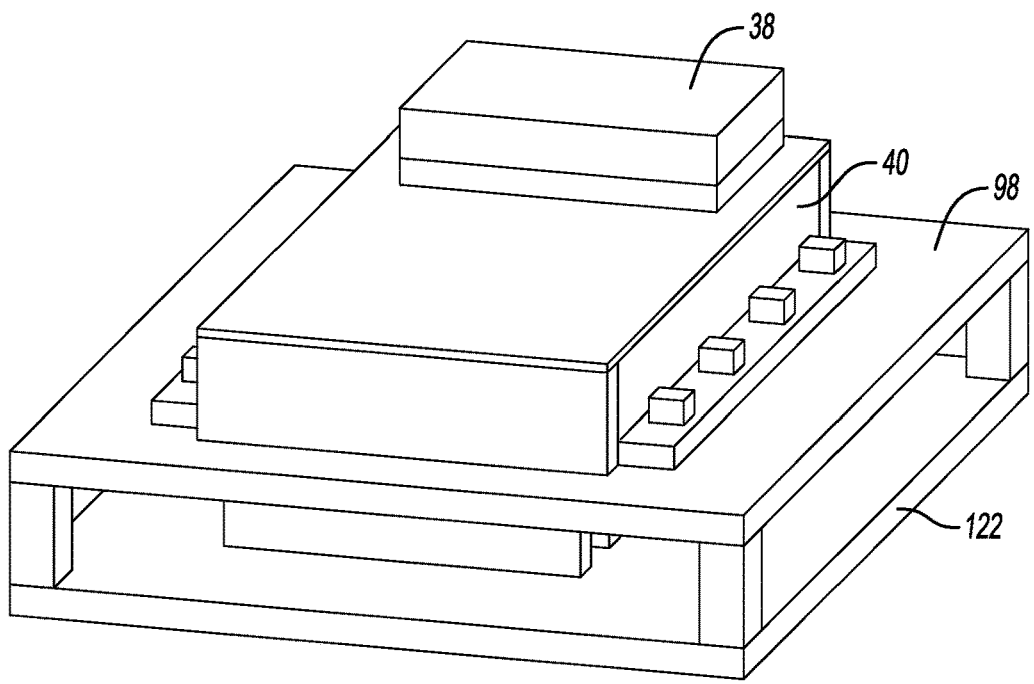
FIG. 12 illustrates the cell matrix and enclosure halo of FIG. 11 after securing an enclosure cover.

Referring now to FIG. 12, after the busbar modules 126, busbars, and other electronics modules are installed and electrical connections are made, the enclosure cover 38 is secured to the enclosure halo 40.

Figure 13:
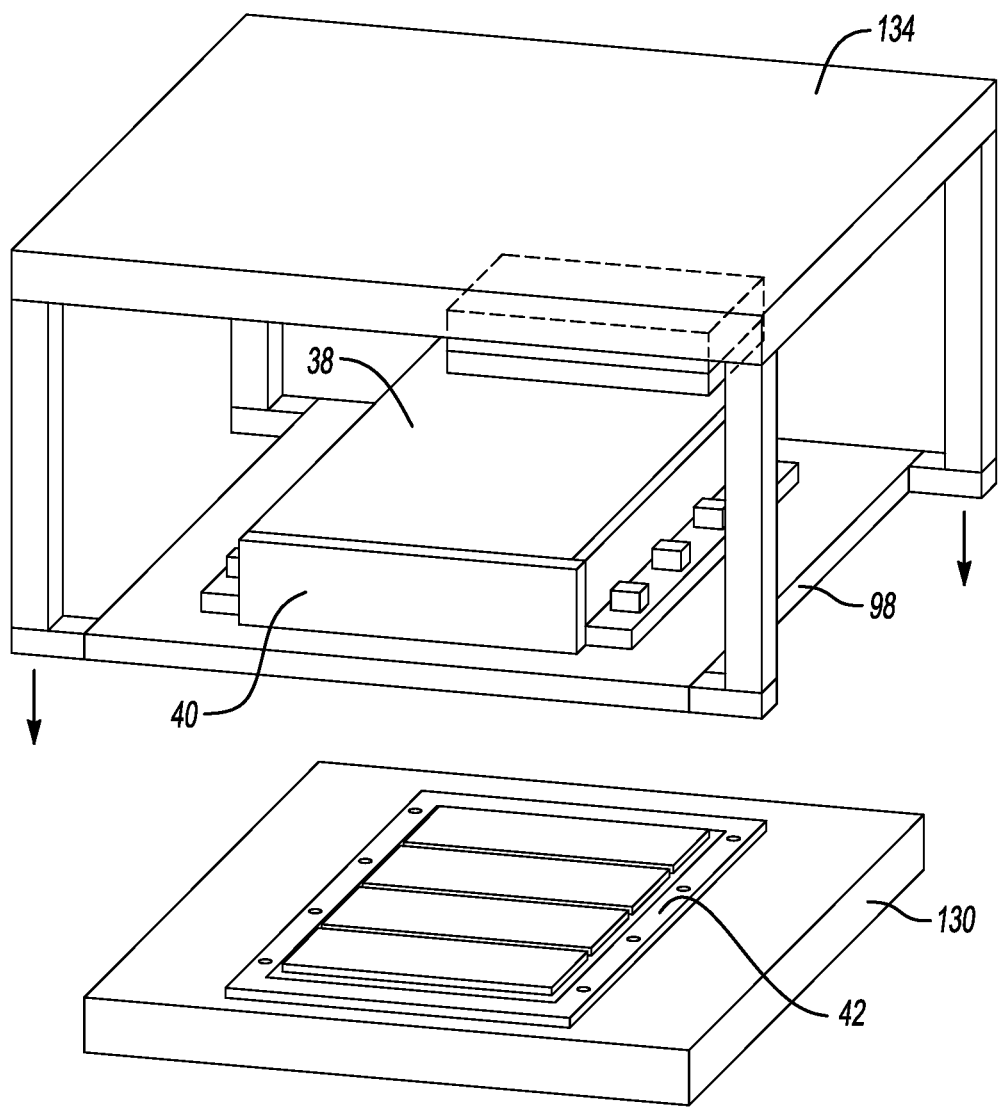
FIG. 13 illustrates the cell matrix and enclosure halo of FIG. 12 just before the securing of an enclosure floor.

With reference to FIG. 13, the halo pallet 98 with the enclosure halo 40 and the cell matrix 50 is next positioned adjacent the enclosure floor 42, which is held by a tray pallet 130. A robotic lifter 134 can be used to position the halo pallet 98.

The tray pallet 130 and enclosure floor 42 are then moved vertically relative to the halo pallet 98, enclosure halo 40, and the cell matrix 50 until the enclosure floor 42 is in a position appropriate for securement to the enclosure halo 40. The enclosure floor 42 is then secured to the enclosure halo 40 via welds or mechanical fasteners, for example. Thermal exchange plates, thermal interface material, etc. can be mounted on the enclosure floor 42 prior to the securing of the enclosure floor 42 to the enclosure halo 40. The traction battery pack 14 can then be installed into the electrified vehicle 10 of FIG. 1.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A traction battery pack assembling method, comprising:
    compressing a first cell stack within a first compression fixture;
    compressing a second cell stack within a second compression fixture;
    positioning the first cell stack and the first compression fixture next to the second cell stack and the second compression fixture; and
    inserting the first and second cell stacks into a cell-receiving opening of an enclosure structure by pushing the first and second cell stacks together into the cell-receiving opening while maintaining compression of each cell stack and transferring a portion of that compression to the enclosure structure during the inserting.

2. The method of claim 1, wherein the first cell stack and the second cell stack are spaced from each other during the pushing.

3. The method of claim 1, further comprising contacting the first cell stack and the second cell stack with a plunger during the pushing.

4. The method of claim 3, wherein the first compression fixture and the second compression fixture establish different perimeter portions of an aperture when the first compression fixture is positioned alongside the second compression fixture, and further comprising extending the plunger through the aperture during the pushing.

5. The method of claim 1, further comprising, positioning a spacer between the first cell stack and the second cell stack, the spacer located between the first cell stack and the second cell stack during the pushing.

6. The method of claim 5, wherein the first cell stack includes a plurality of first cells each directly contacting a first side of the spacer, wherein the second cell stack includes a plurality of second cells each directly contacting an opposite, second side of the spacer.

7. The method of claim 5, wherein the spacer is inserted into the cell-receiving opening together with the first cell stack and the second cell stack.

8. The method of claim 1, wherein a compressive force exerted on the first cell stack by the enclosure structure after the inserting is less than a compressive force exerted on the first cell stack by the first compression fixture prior to the inserting.

9. The method of claim 1, wherein the compressing of the first cell stack is along a first cell stack axis, and the compressing of the second cell stack is along a second cell stack axis, wherein the first cell stack axis is parallel to the second cell stack axis during the inserting.

10. The method of claim 9, wherein the pushing moves the first cell stack and the second cell stack relative to the enclosure structure into the enclosure structure a direction that is perpendicular to both the first cell stack axis and the second cell stack axis.

11. The method of claim 1, further comprising, after the inserting, applying a compressive force to the first cell stack and the second cell stack with the enclosure structure.

12. The method of claim 1, wherein the enclosure structure is an enclosure halo.

13. A traction battery pack assembling method, comprising:
    compressing a first cell stack within a first compression fixture;
    compressing a second cell stack within a second compression fixture;
    positioning the first cell stack and the first compression fixture next to the second cell stack and the second compression fixture; and
    inserting the first and second cell stacks into a cell-receiving opening of an enclosure structure by pushing the first and second cell stacks together into the cell-receiving opening, wherein, during the pushing, the first cell stack is moved out of the first compression fixture into the enclosure structure, and the second cell stack is moved out of the second compression fixture into the enclosure structure.

14. The method of claim 13, wherein the compressing of the first cell stack is along a first cell stack axis, and the compressing of the second cell stack is along a second cell stack axis, wherein the first cell stack axis is parallel to the second cell stack axis during the pushing.

15. The method of claim 14, wherein the enclosure structure circumferentially surrounds the first cell stack and the second cell stack after the inserting.

16. A traction battery pack assembling method, comprising:
arranging a plurality of battery cells into a first group distributed along a first axis, and a second group distributed along a second axis;
compressing the first group of cells to provide a first cell stack, and compressing the second group of cells to provide a second cell stack;
positioning the first cell stack alongside the second cell stack; and
pressing a plunger against the first cell stack and against the second cell stack to move the first cell stack and the second cell stack into a cell-receiving opening of an enclosure structure.

17. The method of claim 16, wherein, during the pressing, the first cell stack is moved out of a first compression fixture into the enclosure structure, and the second cell stack is moved out of a second compression fixture into the enclosure structure.

18. The method of claim 17, wherein the first compression fixture and the second compression fixture establish different perimeter portions of an aperture when the first cell stack is positioned alongside the second cell stack, the plunger extending through the aperture during the pressing.

19. The method of claim 16, wherein the enclosure structure is an enclosure halo.

\* \* \* \* \*